March 18, 1941.　　　　G. P. HEINER　　　　2,235,369
FLY BOOK FOR FISHERMEN
Filed June 20, 1936　　　4 Sheets-Sheet 1
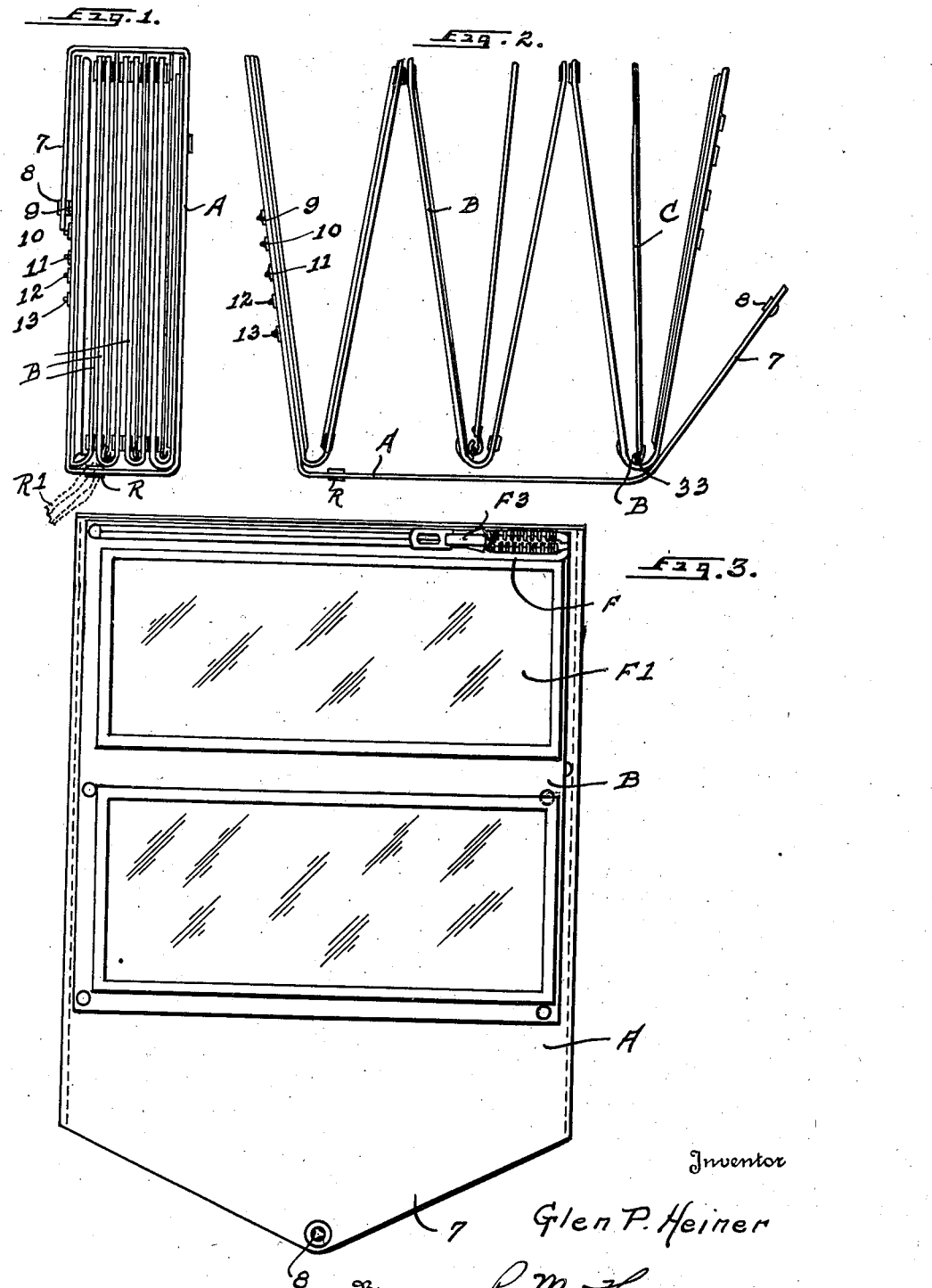

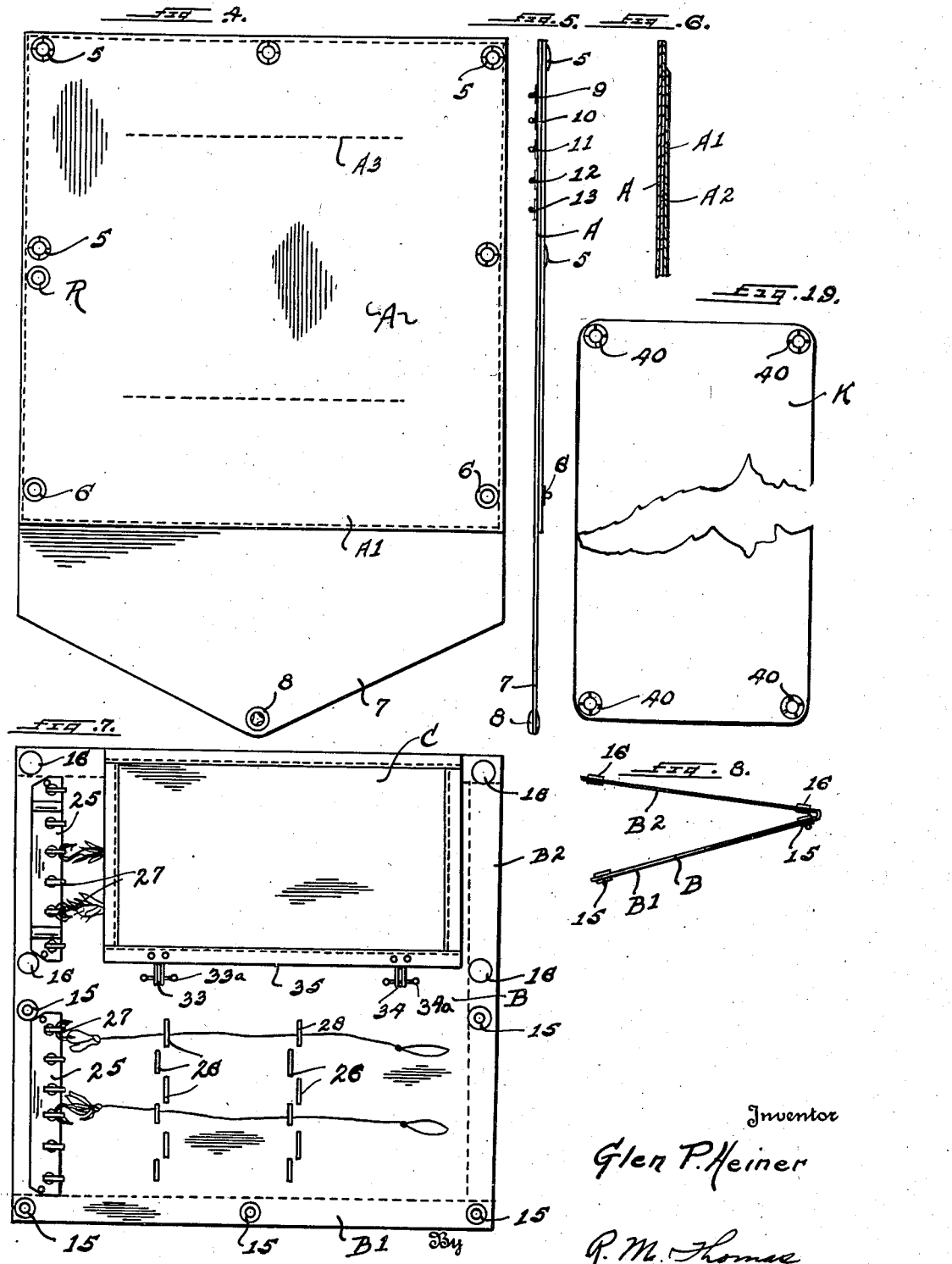

March 18, 1941.  G. P. HEINER  2,235,369
FLY BOOK FOR FISHERMEN
Filed June 20, 1936   4 Sheets-Sheet 3
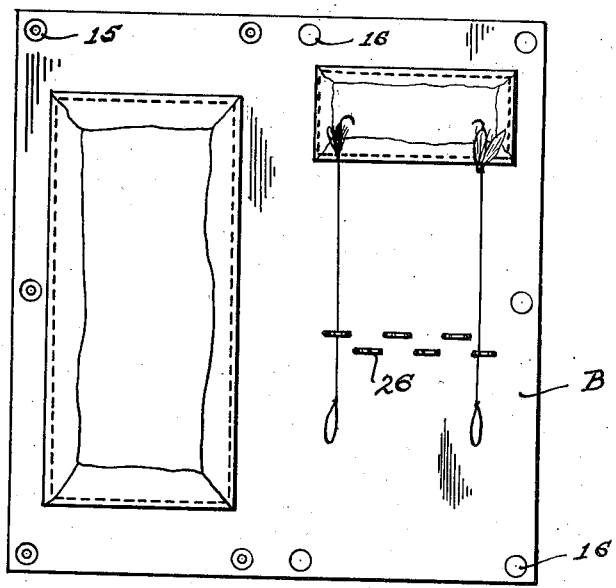
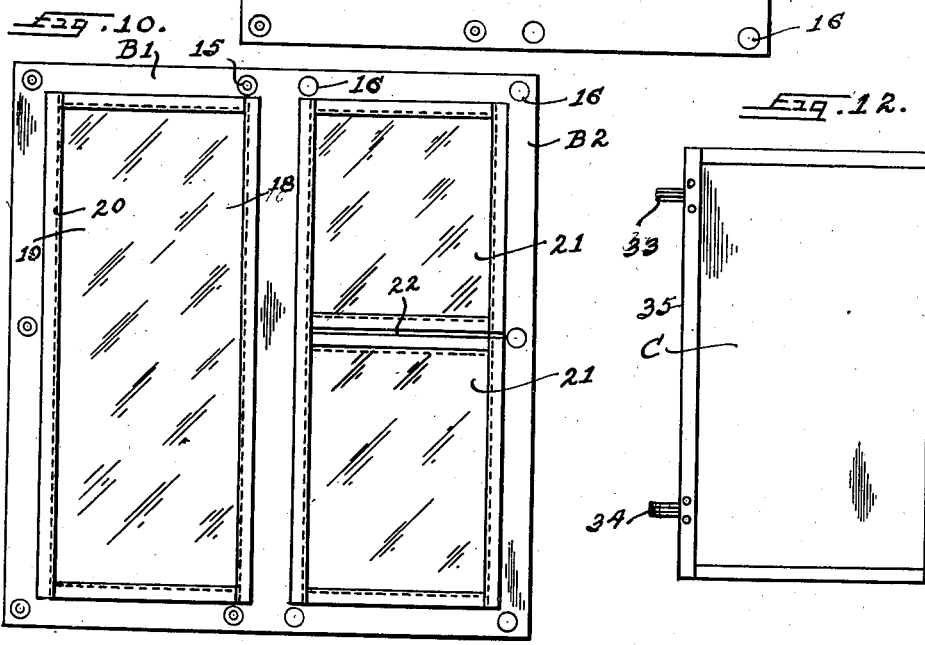
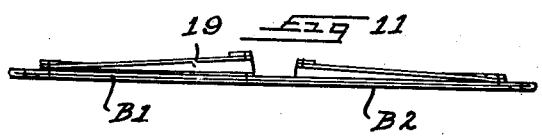
Inventor
Glen P. Heiner
By R. M. Thomas
Attorney March 18, 1941.  G. P. HEINER  2,235,369
FLY BOOK FOR FISHERMEN
Filed June 20, 1936  4 Sheets-Sheet 4
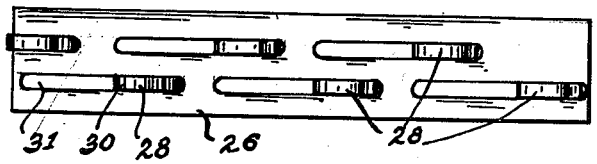
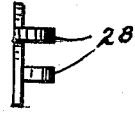
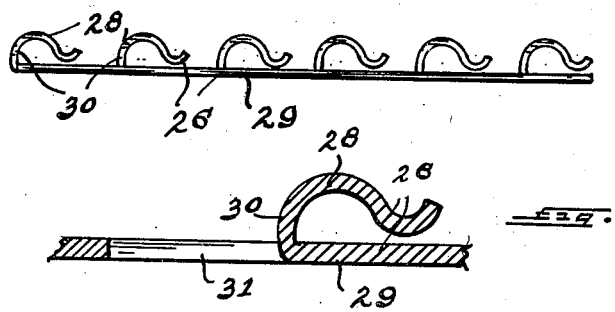
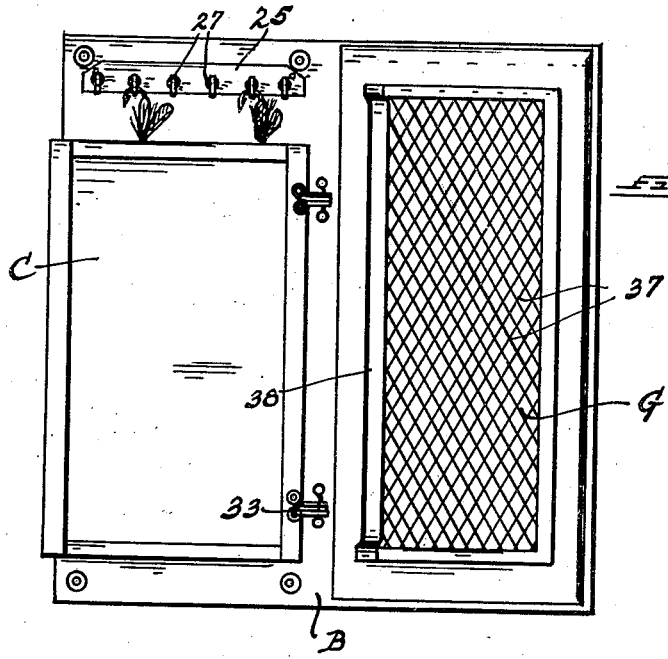
Inventor
Glen P Heiner
By R. M. Thomas
Attorney Patented Mar. 18, 1941

2,235,369

UNITED STATES PATENT OFFICE 2,235,369

FLY BOOK FOR FISHERMEN

Glen P. Heiner, Salt Lake City, Utah

Application June 20, 1936, Serial No. 86,219

2 Claims. (Cl. 43—32)

My invention relates to fishing tackle and has for its object to provide a new and efficient fly book for fishermen.

A further object is to provide a build-up fly book which has a separate cover provided with sufficient stiffening means and adapted to receive any predetermined number of removable leaf sections.

A further object is to provide loose leaves for books which are provided with suitable snap fasteners, hooks, or other devices so that the right end section of one leaf may be secured to the back side of the left end of another like leaf.

The fasteners on all leaves are set in the same places and are made to fit one leaf to the next. The book or cover is also provided with like fasteners to which the removable leaves are secured.

A still further object is to provide a cover and loose leaf system for fly books which is so made that any predetermined number or less than this number of leaves may be inserted into and carried in the book at any one time.

A still further object is to provide a loose leaf book which is also provided with suitable wet leaves for each leaf section desired, and which wet leaf may be used wet or dry but, which book in its entirety may be disconnected and separated for drying after having been used on a fishing trip. After each day of fishing each wet leaf must be removed and dried or else the back leaf section must be released from the back of the next leaf until all leaves having the wet leaf sections used therein may be separated and the book may then be hung up to dry or else may be stood on end with the wet leaves held in open position so that the air may strike all sides of the wet leaves and also the flies in the book and the leaf sections drying the entire book until next use.

The cover for the book is also provided with suitable snap fasteners so that when sufficient leaf sections have been inserted, the book may be snapped into folded or closed position. Each leaf section is made with the desired form, some being for snelled flies, some being for leaders with a perforated or net pocket for leaders to enable the fishermen to see them without removing them from the pocket.

Also some of the leaf sections are provided with cellulose windows to allow the user to see the articles in the pocket, also some of the sections may be provided with a transparent pocket, having a zipper or slide fastener therefor.

I have also provided new and efficient ways of holding the snells for the hooks and for holding the hooks in place and as shown in my copending applications, I have removable leaf sections carrying suitable dry fly boxes therein to hold dry flies for the dry fly fishermen with new methods of holding the flies in place in the boxes. These copending applications for patent will be hereinafter set forth in detail as to date of filing, serial number and title.

With this invention set out in the following specifications I have endeavored to build up sectional fly books for every type of fisherman and for every need he may have, at the same time providing a book which may be bought with separate leaves, the fisherman building the book up one leaf at a time as he desires or buying all of the leaves at one time, depending upon his desires or ability to buy such sections.

These objects I accomplish with the book shown in the accompanying drawings in which similar numerals and letters of reference indicate like parts throughout the several views and as described in the specification forming a part of this application and pointed out in the appended claims.

In the drawings in which I have shown my book

Figure 1 is an end view of the book folded and closed as for carrying, with dotted lines showing the retaining cord which may be used to tie the book to the fisherman's clothing to prevent its loss.

Figure 2 is a view of the book with some of the leaves shown in place extended as for drying or building up the book.

Figure 3 is a plan view of the cover with some of the leaves in place.

Figure 4 is a plan view of the cover extended with no leaves in use.

Figure 5 is an edge view of the back shown in Figure 4.

Figure 6 is a section of one portion of the back to show the stiffening means used in the cover.

Figure 7 is a plan view of one of the leaf sections showing the removable wet leaf, the new type of hook holding means, and the new snell holding racks.

Figure 8 is an end view of one of the leaf sections showing the fastening means used.

Figure 9 is a plan view of a different form of removable leaf in which sheep's wool is used in which the hooks may be secured.

Figure 10 is a plan view of one of the leaves showing the transparent pockets.

Figure 11 is a transverse section of Figure 10.

Figure 12 is a plan view of one of the removable wet leaves.

Figure 13 is a plan view of one of the snell racks.

Figure 14 is an end view of Figure 13.

Figure 15 is an edge view of Figure 13.

Figure 16 is an enlarged section of one of the snell racks.

Figure 17 is a plan view of a different build up leaf showing the use of the net pocket in combination with a fly holding section of the book.

Figure 18 is a longitudinal section of the net pocket showing an extra pocket sewed onto the back side thereof when desired.

Figure 19 is a plan view of a removable snelless fly box, parts cut away, which is provided with snap fasteners to hold it to the other leaves of the book.

In the drawings I have shown the cover for my book as A, having female snap fasteners 5, on the inner side of one end of the book, and with male snap fasteners 6, on the other end of the inner side of the cover. The flap end 7 of the cover is provided with a female fastener 8 in the apex thereof, and the back side of the cover shown in Figures 1, 2, and Figure 5, show several spaced apart male snap fasteners 9, 10, 11, 12, and 13, which may be inserted into the female fastener to hold the entire cover in closed position. The female snap fastener 8 is preferably of the spring held type sold on the market but any desired type may be used if found efficient. The cover A is made of two sheets of fabric or like material shown with the outside sheet as A and the inside sheet as A1. The inside sheet A1 is only made square in form without the flap end 7, and between these two sheets A and A1 there is a stiffening sheet of suitable material shown as A2. Pyralin or other flexible material may be used as the stiffening sheet A2. The sheet A2 is held in place by stitching along the center of the two half sides shown in Figure 4 as stitches A3.

The leaf sections of my book are shown as B. Each section is provided with male snap fasteners 15 on one leaf and section B1 and with female snap fasteners 16 on the other leaf section B2. All of these fasteners are preferably secured through the leaf section and each leaf is made with the fasteners on the back or joining faces which abut with the next leaf. The inner side of each leaf is provided with any desired pocket such as that shown at 18 Figure 10, in which a pocket is made of a transparent Celluloid face 19 secured to the leaf by suitable stitching 20. The pocket 21 shown on the other leaf section B2 is made with the medial section of the pocket split at 22 to allow either flap of the pocket to be raised a short distance to allow for easy access to the pocket.

In the leaf sections shown in Figure 7 the new type of hook rack 25 is secured to one end of the leaf sections B1 and B2 and the snell clamps 26 are secured through the leaf sections as indicated, to hold the snell and hook in fixed relation to the book. The hook racks 25 are provided with loops 27 into which the hooks are inserted. The snell clamps 26 are made with a loop section 28 raised from the body 29 of the clamps by a die which cuts away a section 30 and is depressed through the opening 31 made by removing the section, the loop is then curved and formed as shown in Figures 13 to 16 inclusive.

The removable wet leaf is shown as C. Each wet leaf is provided with a hook fastener 33 secured to the inner edge 35 of the leaf with preferably two fasteners used with one fastener 34 set farther from the end than the fastener 33 so that the leaf may be inserted into the leaf section as desired, depending upon the size of hook being carried in that particular leaf section.

The removable slide fastener pocket F is shown in Figure 3 and may be made in any leaf section desired with the transparent pocket F1 showing the contents in the pocket. Any good type of slide fastener F3 may be used, that shown being of the "talon" type.

The leader pocket G shown is of a net face 37 secured to form the pocket 38 in which the leaders may be inserted preferably from the back side as shown in Figure 17. In Figure 9 of the drawings I have shown a removable leaf having one leaf provided with a sheep skin surface in which fly hooks may be inserted and on the right hand side of the figure I have shown a strip of sheep skin secured to the leaf and using my small clamps 26 to hold the snell of the hooks which are shown with the barb of the hook engaged in the wool.

The cover A of the book is provided with a ring or eyelet R in which a string R1 may be secured and by which the book may be tied to the clothing of the fisherman to prevent the book being lost.

In Figure 19 I have shown a plan view of a fly box K and the box K is provided with snap fasteners 40 by which it is secured to the other leaves of the book. It will be also obvious that a separate leaf might be used surrounding the box and the snap fasteners used to secure the box to the leaf and then securing the leaf to the other leaves of the book by like snap fasteners.

The other separate sections of this book mentioned in the specification heretofore and not shown in the drawings are fully disclosed in my copending applications for patents for specific details thereof. Also the removable slide fastener pocket, the special hook rack, the special snell rack, the wet leaf, and the dry fly box, are covered by separate copending applications for patent. The copending applications for patents mentioned above are as follows: Hook racks for fly books, Serial No. 86,214, issued into Patent No. 2,173,395 of September, 1939; Removable snelless fly boxes, Serial No. 86,215, filed June 20, 1936; Removable wet leaf for fly books, Serial No. 86,216, filed June 20, 1936; Snell racks for snelled flies, Serial No. 86,217, filed June 20, 1936; and Removable slide fastener pocket and leader pocket, Serial No. 86,218, filed June 20, 1936.

Modifications and changes made in this book may be made but applicant feels that they are within the spirit of his invention and the scope of his claims.

Having thus described my invention, I desire to secure by Letters Patent and claim:

1. In a fly book in which the leaves and parts are quickly removed or reinserted, the combination of a flat sheet of fabric forming a cover, said cover having stiffening means secured in one side thereof; male and female snap fasteners secured on the inside of said cover; a female snap fastener secured to the closing flap of one end of said cover; multiple male fasteners secured to the outside of the other end of said cover one to engage the female fastener on the flap of the cover, depending upon the number of leaves in the cover; separate leaves formed of a flat sheet of fabric folded medially thereof each leaf having male fasteners on all four corners and along the outer edge on one half thereof and female fasteners on the other half in like positions with each successive leaf to be formed with identical fasteners in like positions the male fasteners to be received in the female fasteners to lock each successive leaf to the next leaf and to secure each outside leaf to the cover of the book each leaf carrying different means for carrying flies.

2. In a fly book, the combination of a flat sheet of fabric having reinforcing fabric secured to the inner face thereof with one end tapered, the entire sheet to be utilized as a cover; a female snap fastener in the tapered end; male fasteners secured to the opposite outside face of the other end of said cover to engage the female fastener to smoothly engage the cover around any multiplicity of leaves therewithin; spaced apart female snap fasteners secured in the corners and medially thereof in the end of the book not tapered; leaf sections for said book comprising flat sheets of fabric having male fasteners set spaced equal to those of the cover in one half of said leaf and female fasteners set in opposed direction in the other half of said leaf, said leaf to be folded medially when inserted in said book; the fasteners at each back edge of said leaves being to be disengaged to spread the back of the leaf sections apart for aerating; fly hook engaging mediums secured to some of said leaves; and removable snell moistening sheets carried in those sheets carrying flies said sheets being removably mounted at the medial bend of the sheet to engage both sides when the leaf is folded in the book.

GLEN P. HEINER.